United States Patent [19]

Ross, Sr.

[11] 4,400,592
[45] Aug. 23, 1983

[54] ELECTRIC POWER TRANSMISSION SYSTEM

[75] Inventor: Donald R. Ross, Sr., Pittsburgh, Pa.

[73] Assignee: U-S Safety Trolley Corporation, Pittsburgh, Pa.

[21] Appl. No.: 291,553

[22] Filed: Aug. 10, 1981

[51] Int. Cl.³ .............................................. B60L 5/08
[52] U.S. Cl. ..................................... 191/34; 191/53; 191/59.1
[58] Field of Search ................. 191/23 A, 34, 53, 59.1

[56] References Cited

U.S. PATENT DOCUMENTS

| | | | |
|---|---|---|---|
| 567,411 | 9/1896 | Priest | 191/53 |
| 1,914,467 | 6/1933 | Stevens | 191/34 |
| 3,826,880 | 7/1974 | Ross | 191/59.1 X |

Primary Examiner—Richard A. Schacher
Attorney, Agent, or Firm—Carothers & Carothers

[57] ABSTRACT

An overhead metal trolley rail has a head for supporting it, separated by a vertical web from a foot that projects from opposite sides of the web and has flat upper contact surfaces. Slidable along the rail is a trolley shoe formed from a block of electrical conducting material, the upper portion of which has a longitudinal trough in it receiving the foot of the rail. The lower portion of the trough is spaced from the rail, but the upper portion of the trough has longitudinal flanges projecting inwardly toward each other above the foot of the rail. The flanges have flat lower contact surfaces engaging flat against the flat contact surfaces of the rail and supporting the shoe, from which a power take-off wire extends.

3 Claims, 4 Drawing Figures

ELECTRIC POWER TRANSMISSION SYSTEM

Traveling cranes obtain their electric power through cables connected to trolley wheels or shoes that move along overhead electrical conductors, such as trolley wires or rails. The same type of system may be used in supplying electric current to other electrical equipment that must move around. Sometimes the electrical conductor along which a trolley shoe slides is merely a wire. In other cases it may be a flexible conductor but provided with a head running along its top for gripping by hangers that support the conductor. Such a conductor may be more accurately called a rail. The shoe that slides along such a conductor has a trough in its upper portion for receiving the wire or rail. The trough serves to guide the shoe along the conductor by preventing them from moving laterally relative to each other. To hold the shoe up tight against the lower surface of the conductor, the general practice has been to provide the trolley pole with a spring that exerts upward pressure against the shoe. In many cases this is sufficient to prevent the separation of the shoe from the wire or rail. However, there are situations in which such separation can and does occur. For example, if an overhead crane is being used in the open, high winds may cause the trolley conductor to swing and whip around so that the trolley shoe is thrown out of engagement with it. Putting the shoe back on the track can be difficult and time-consuming. A solution to this problem has been disclosed in my U.S. Pat. No. 3,826,880, in which the opposite sides of the upper portion of the trough in the collector shoe project toward each other above the foot of a rail. The foot is wider than the portion of the rail immediately above the foot. The lower surface of the foot serves as the electrical contact surface engaged by the upwardly urged shoe, while the only purpose of the portions of the shoe overlying the foot is to prevent accidental separation of the shoe from the rail. An objection to such a system is that it requires a trolley pole and a spring to press the collector shoe up against the bottom of the conductor rail, thereby adding a significant amount to the cost.

It is among the objects of this invention to provide an electric power transmission system of the type just discussed, in which the trolley shoe is suspended from the conductor rail by gravity, and in which the conventional trolley pole and spring are eliminated.

The preferred embodiment of the invention is illustrated in the accompanying drawings, in which FIG. 1 is a fragmentary side view of a conductor rail and collector shoe;

Figure 1:
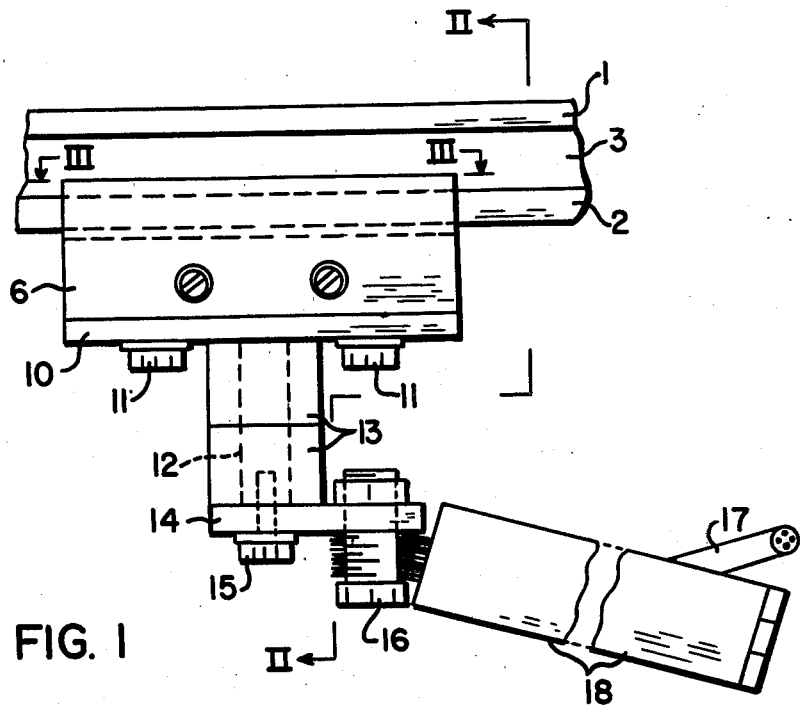
Figure 2:
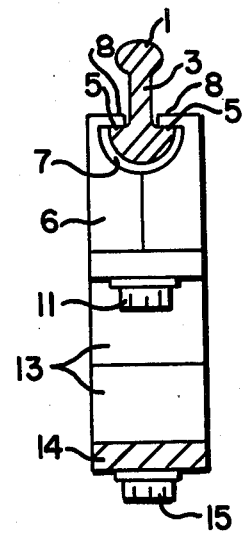
FIG. 2 is a vertical section taken on the line II—II of FIG. 1.
Figure 3:
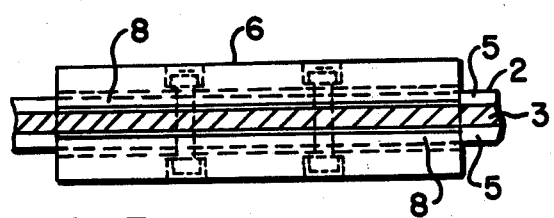
FIG. 3 is a horizontal section taken on the line III—III of FIG. 1.

Referring to FIGS. 1 to 3 of the drawings, an overhead trolley rail is formed from any desired length of metal suitable for conducting electricity, such as copper. The rail has a head 1 and a foot 2 extending throughout its length. They are separated by a vertical web 3 that is integral with them. The web and head together have a T-shape in cross section. The rail is suspended from hangers located at spaced intervals along its length, such as shown in U.S. Pat. No. 3,826,880.

The foot of the rail projects from opposite sides of the web above it and preferably has a transversely curved lower surface. It is a feature of this invention that the upper edges of this curved surface are connected with the web of the rail by upper surfaces 5 that are flat and that are substantially perpendicular to the web, as shown in FIG. 2. These flat surfaces form the electric contact surfaces of the rail. The rail may be enclosed in a tubular guard of flexible insulating material that extends along the rail as shown in my above-mentioned patent.

Slidably mounted on the rail is a trolley shoe 6. The shoe is an elongated block of electrical conducting material, such as copper or graphite or a mixture of both, and the upper part of the block is provided with a central trough 7 that extends throughout the length of the block and receives the foot of the rail. The trough is larger in cross section than the foot of the rail and is spaced from its curved lower surface as shown in FIG. 2. The sides of the trough extend up past the opposite sides of the foot and have integral longitudinal flanges 8 projecting inwardly toward each other above the foot. Since the distance between these flanges is less than the width of the foot of the rail that they overlie, the shoe is locked onto the rail and there is no possibility of the shoe moving down away from the rail or of the rail moving upwardly away from the shoe. The lower surfaces of the shoe flanges are flat and engage flat against the flat contact surfaces 5 of the rail by gravity and thereby support the shoe from the rail. No trolley pole nor spring is necessary. The relatively large areas of the engaging contact surfaces provide for the desired flow of electric current from the rail to the shoe. A metal bar 10 is secured to the bottom of the collector shoe by bolts 11, and the upper end of a metal stud 12 is welded to the center of the bottom of this bar. Insulating rings 13 encircle the stud and are held in place by a plate 14 pressed up against the lower ring and the lower end of the stud by means of a screw 15 threaded in a bore in the lower end of the stud. This plate projects from the rings toward one end of the shoe and supports a bolt 16 provided with a slot through it, through which the wires of an electric cable 17 project and in which they are compressed and held between the plate and the head of the bolt. The cable extends down to the crane or other equipment that is to receive electric power from the conductor rail. Preferably, the cable extends down through a rigid insulating tube 18, the lower end of which is provided with means for bolting it to a crane or the like. The lower portion of the tube is provided with an opening in its wall, from which the cable emerges. When the crane, for example, moves in one direction the cable pulls the shoe along with it. When the crane moves in the opposite direction the tube pushes on plate 14 and thereby pushes the shoe along the rail. This is much simpler and cheaper than using a trolley pole and spring. Gravity takes the place of a spring.

Figure 4:
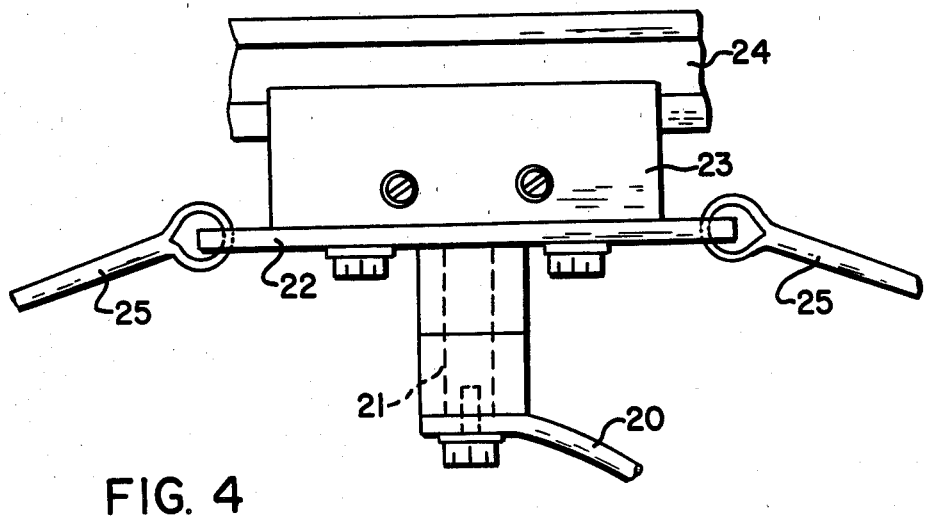
FIG. 4 is a view, similar to FIG. 1, of a modification.

In the modification shown in FIG. 4, an electric cable 20 is bolted directly to the lower end of the stud 21 that is secured to bar 22 fastened to the bottom of the shoe 23, and the insulating tube of FIG. 1 is omitted. For moving the shoe along the rail 24, tow lines 25 are secured to the extended ends of bar 22. These lines extend in opposite directions away from the shoe and are attached to suitable locations on the crane. When the crane moves in one direction it pulls on one line, and when it moves in the opposite direction it pulls on the other line, whereby the shoe follows the crane in either direction. As in the first embodiment of the invention, the shoe is supported by the rail, with which it makes electrical contact by gravity.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. An electric power transmission system comprising an overhead electrified metal trolley rail having a head and a foot separated by a vertical web integral therewith, the head being adapted to be gripped by hangers for supporting the rail, said foot projecting from opposite sides of the web and having flat upper contact surfaces separated by the web and substantially perpendicular thereto, a trolley shoe slidable along the rail and formed from an elongated block of electrical conducting material extending lengthwise of the rail, the upper portion of the block having a central trough therein extending from end to end of the block and receiving said foot of the rail with the lower portion of the trough spaced from the bottom of the rail, and the upper portion of the trough having integral longitudinal flanges projecting from its opposite sides inwardly toward each other above said foot of the rail, said flanges having flat lower contact surfaces engaging flat against said flat contact surfaces of the rail foot by gravity, the flanges supporting said shoe from the rail, and means secured to the shoe for electrically connecting a power take-off wire thereto.

2. An electric power transmission system according to claim 1, in which said electrical connecting means is a rigid member extending downwardly from the bottom of said shoe, and said system includes a power take-off wire connected with the lower end of said member and inclined downwardly away from the shoe lengthwise of said rail, a rigid tube enclosing said wire, and means connecting said wire and the lower end of said tube with a vehicle to be driven by electric power from said rail, whereby movement of the vehicle will push or pull from shoe along the rail.

3. An electric power transmission system according to claim 1, in which said electrical connecting means is a rigid member extending downwardly from the bottom of said shoe, and said system includes a power take-off wire connected with the lower end of said member, and tow lines connected with the opposite ends of the shoe and adapted to connect it with a vehicle to which electric power is supplied by said wire.

* * * * *